United States Patent
Zhou et al.

(10) Patent No.: US 8,059,496 B1
(45) Date of Patent: *Nov. 15, 2011

(54) MAGNETIC CORE PLASMON ANTENNA WITH RECESSED PLASMON LAYER

(75) Inventors: Yuchen Zhou, San Jose, CA (US); Xuhui Jin, San Jose, CA (US); Kenichi Takano, Santa Clara, CA (US); Moris Dovek, San Jose, CA (US); Tobias Maletzky, Milpitas, CA (US); Erhard Schreck, San Jose, CA (US); Joe Smyth, Aptos, CA (US)

(73) Assignee: Headway Technologies, Inc., Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/804,232

(22) Filed: Jul. 16, 2010

(51) Int. Cl.
*G11B 11/00* (2006.01)

(52) U.S. Cl. ............ 369/13.33; 369/13.13; 369/112.27

(58) Field of Classification Search ............... 369/13.33, 369/13.32, 13.13, 13.02, 112.27, 13.24; 360/59, 360/128, 245.3
See application file for complete search history.

(56) References Cited

U.S. PATENT DOCUMENTS

| | | | |
|---|---|---|---|
| 7,710,686 B2 | 5/2010 | Kim et al. | |
| 7,821,880 B2 * | 10/2010 | Tanaka et al. | 369/13.33 |
| 2008/0192376 A1 | 8/2008 | Tanaka et al. | |
| 2008/0198496 A1 | 8/2008 | Shimazawa et al. | |
| 2010/0103553 A1 | 4/2010 | Shimazawa et al. | |
| 2010/0128376 A1 | 5/2010 | Tanabe et al. | |
| 2010/0315735 A1 * | 12/2010 | Zhou et al. | 360/59 |

OTHER PUBLICATIONS

Co-pending US Patent HT09-003, U.S. Appl. No. 12/456,290, filed Jun. 15, 2009, "Plasmon Antenna With Magnetic Core for Thermally Assisted Magnetic Recording," assigned to the same assignee as the present invention, 49 pages.
Co-pending US Patent HT09-066, U.S. Appl. No. 12/802,096, filed May 28, 2010, "Plasmon Shield to Shape and Reduce Optical Spot," assigned to the same assignee as the present invention, 48 pages.

* cited by examiner

*Primary Examiner* — Ali Neyzari
(74) *Attorney, Agent, or Firm* — Saile Ackerman LLC; Stephen B. Ackerman

(57) ABSTRACT

Various embodiments of a TAMR head having a magnetic core antenna (MCA) with a recessed plasmon layer are disclosed. An end of the plasmon layer is separated from the ABS by a magnetic layer that transmits the plasmon mode from the plasmon layer and transmits magnetic flux from an adjacent main pole layer. Both of the MCA and magnetic layer may have a triangular shape from an ABS view. There may be a non-magnetic separation layer between the MCA magnetic core and the main pole. Furthermore, a magnetic shield may be included with a side at the ABS, a side facing an end of a waveguide that transmits electromagnetic radiation to the MCA, and a side facing an edge of the plasmon layer. The recessed plasmon layer allows an improved overlay of the thermal heating spot on the magnetic field gradient at the magnetic medium that provides better TAMR performance.

27 Claims, 12 Drawing Sheets

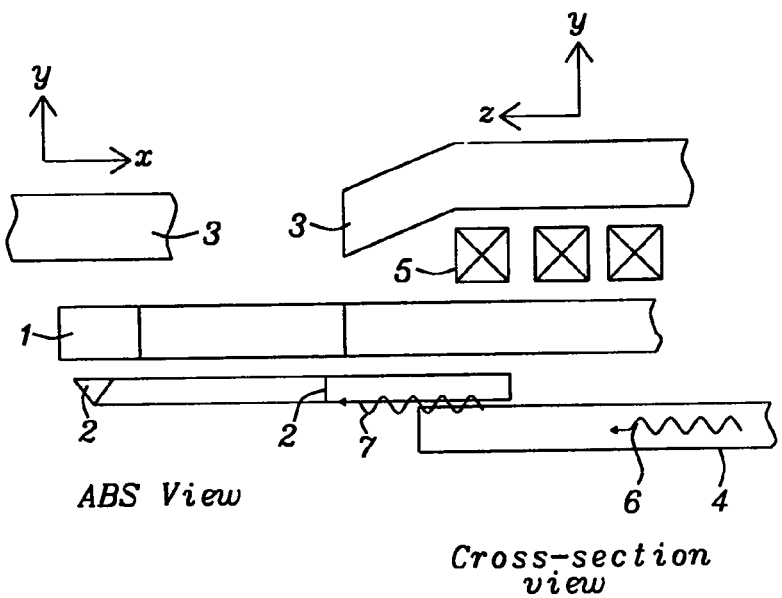
FIG. 1a – Prior Art
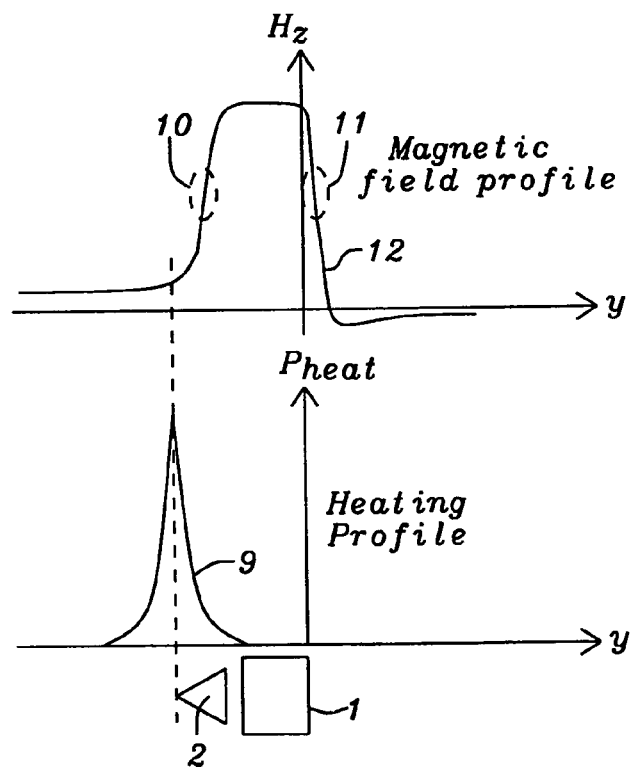
FIG. 1b – Prior Art

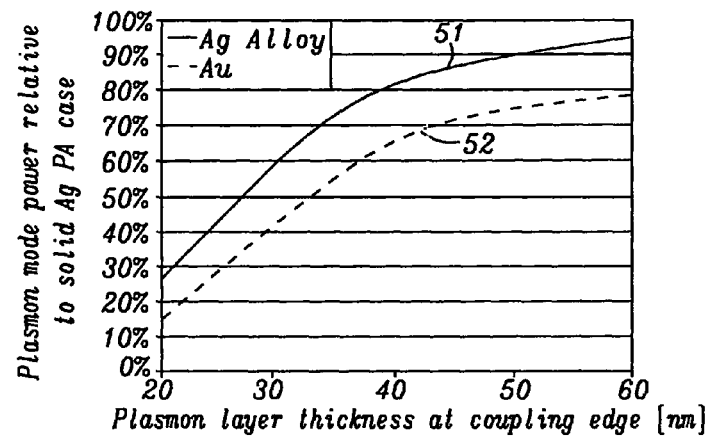
FIG. 4
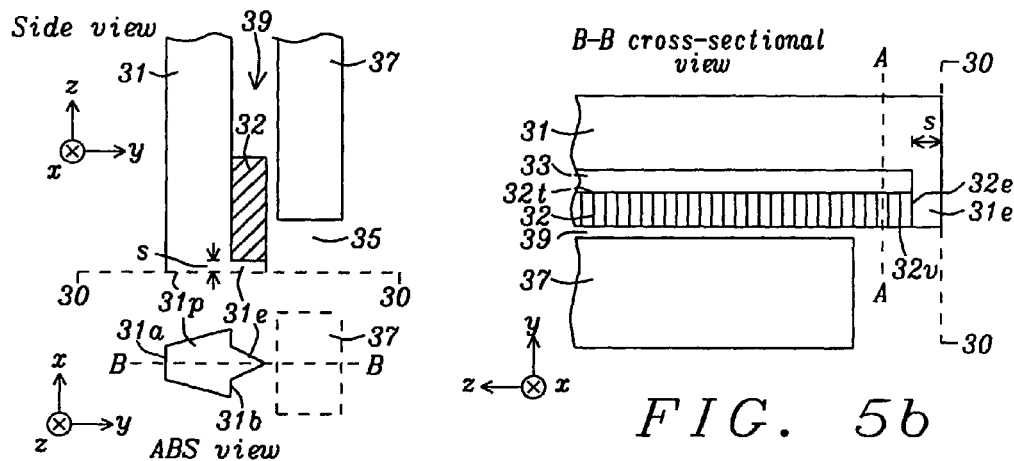
FIG. 5a
FIG. 5b
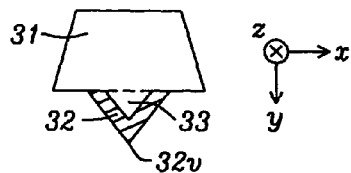
FIG. 5c

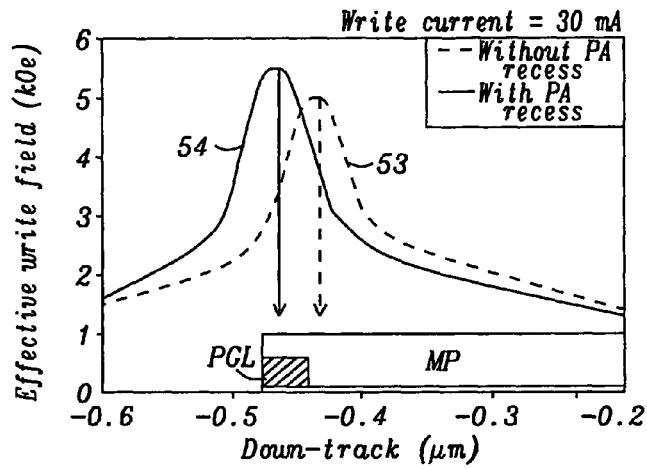
FIG. 9
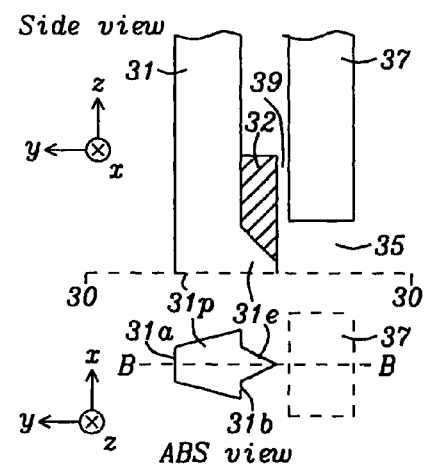 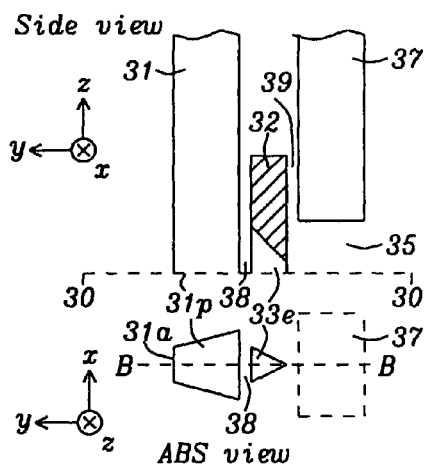
FIG. 10   FIG. 11

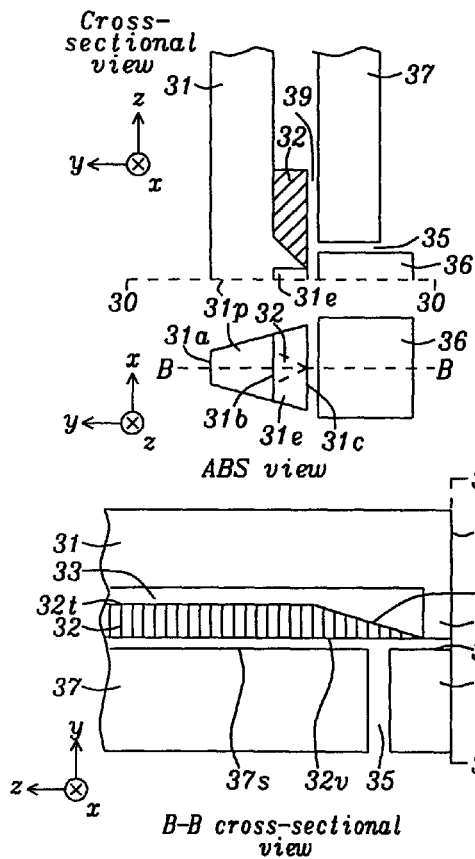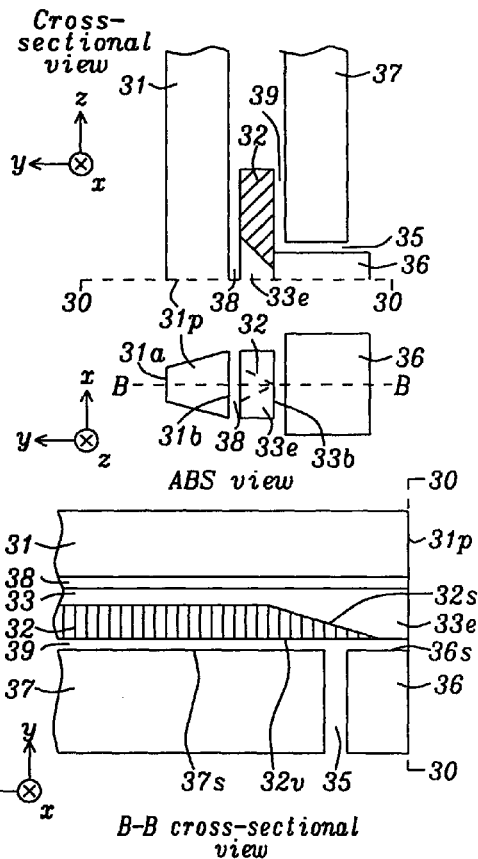
FIG. 16　　　FIG. 17
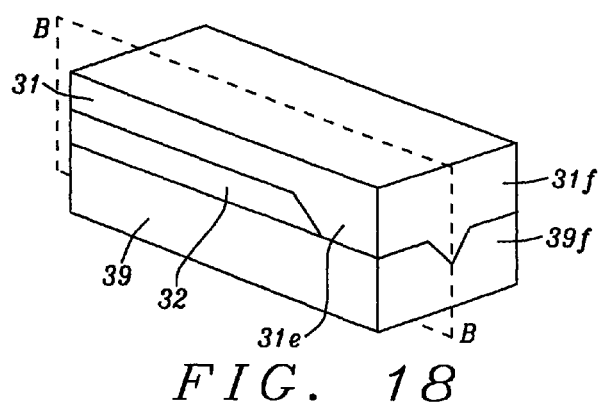
FIG. 18

MAGNETIC CORE PLASMON ANTENNA WITH RECESSED PLASMON LAYER

RELATED PATENT APPLICATIONS

This application is related to the following: Ser. No. 12/456,290, filing date Jun. 15, 2009; and Ser. No. 12/802,096, filing date May 28, 2010; both assigned to a common assignee and herein incorporated by reference in their entirety.

FIELD OF THE INVENTION

The invention relates to magnetic read/write heads based on thermally assisted magnetic recording (TAMR) and in particular to a structure in which a magnetic core antenna (MCA) has a plasmon generator layer that is recessed from an air bearing surface (ABS) to minimize the spacing between the magnetic field peak and heating profile peak at the magnetic medium and thereby improves writing efficiency and increases data density.

BACKGROUND OF THE INVENTION

TAMR is expected to be one of the future generations of magnetic recording technologies that will enable recording at ~1-10 Tb/in$^2$ data densities. TAMR involves raising the temperature of a small region of the magnetic medium to near its Curie temperature where both of its coercivity and anisotropy are significantly reduced and magnetic writing becomes easier to achieve even with weak write fields characteristic of small write heads in high recording density schemes. In TAMR, optical power from a light source is converted into localized heating in a recording medium during a write process to temporarily reduce the field needed to switch the magnetizations of the medium grains. Thus, with a sharp temperature gradient of TAMR acting alone or in combination with a high magnetic field gradient, data storage density can be further improved with respect to current state of the art recording technology.

In addition to the components of conventional write heads, a TAMR head also typically includes an optical wave guide (WG) and a plasmon antenna (PA) or plasmon generator (PG). The wave guide serves as an intermediate path to guide the external laser light to the PA or PG where the light optical mode couples to the local plasmon mode of the PA or to the propagating plasmon mode of the PG. After the optical energy is transformed to plasmon energy, either with local plasmon excitation in the PA or with energy transmission along the PG, it is concentrated at the medium location where heating is desired. Ideally, the heating spot is correctly aligned with the magnetic field from the write head to realize optimum TAMR performance. However, in current TAMR configurations, alignment has been difficult to achieve and there is need for improvement in order to compete with other forms of magnetic recording such as microwave assisting magnetic recording (MAMR).

A thermally assisted magnetic head structure disclosed in U.S. Patent Application Publication 2010/0103553 employs an edge plasmon mode that is coupled to a wave guide as represented in FIG. 1a. Conventional components of a magnetic recording structure include a main pole 1, return pole 3, and write coils 5 formed along an air bearing surface (ABS) 8-8. In the ABS view, plasmon generator 2 has a triangular shape with an edge proximate to the waveguide 4. As shown in the cross-sectional view, waveguide (WG) 4 directs the input optical light wave 6 toward the ABS 8-8 and is recessed a certain distance from the ABS. Optical wave 6 couples to the edge plasmon (EP) mode 7 that is excited and propagates along the sharp edge 9 of plasmon generator 2 adjacent to the WG 4. Plasmon mode 7 further delivers the optical power toward the ABS and locally heats a medium (not shown) placed underneath the plasmon generator 2. A plasmon generator is typically made of noble metals such as Ag and Au that are known to be excellent generators of optically driven surface plasmon modes. The local confinement of the edge plasmon mode 7 is determined by the angle and radius of the triangle corner.

In theory, an edge plasmon generator (EPG) can be engineered to achieve a very tiny light spot as well as a high temperature gradient in the medium for a TAMR recording scheme. Moreover, a plasmon generator with a substantial length in a direction perpendicular to the ABS will have a large metal volume that can avoid localized heating damage during TAMR writing compared to an isolated plasmon antenna of smaller volume. In TAMR, a written bit strongly depends on the thermal spot size and shape in the recording layer, and on the alignment between the magnetic gradient and thermal gradient. The magnetic medium is heated by an EPG in which the optical energy is confined around a vertex (tip) of two converging EPG sides thereby forming a so-called edge plasmon mode. Clearly, the confinement of the optical spot or EP mode in this design is a function of the shape, angle, and size of the tip, the metal composition of the EPG, and the dielectric material surrounding the tip.

In the prior art, the objective of correctly aligning the optical heating profile with the magnetic field profile has not been adequately addressed. As FIG. 1b illustrates, state of the art TAMR technology still delivers the heating spot represented by heating profile 9 at the far leading edge of the main pole's magnetic field profile 12. Although this configuration can achieve writing when sufficient heating is applied, it is not the most desired condition for TAMR writing. The full advantage of TAMR recording can be realized when the heating profile 9 slope is aligned at the same y-axis (down-track) position as the slope 10 or 11 of the magnetic trailing edge field. As a result, magnetic and thermal gradients assist each other to achieve the highest effective gradient during magnetic recording. Due to structural waveguide limitations such as thickness and configuration, and the choice of antenna design, a highly effective alignment of magnetic and thermal gradients has not been fabricated yet in TAMR technology. In addition to the issue of down-track mis-alignment as mentioned above, cross-track alignment is also affected by the overlay of the antenna heating spot on the highest head field. Thus, there is a need for a better plasmon antenna design and an optimized TAMR structure so that the alignment of the heating spot and magnetic field is improved during a write process without sacrificing the efficiency of coupling the optical energy into the plasmon mode.

In U.S. Patent Application 2010/0128376, a nearfield light generator is described that applies nearfield light to a minimal area.

U.S. Pat. No. 7,710,686 teaches a nano aperture antenna having a small spot diameter of tens of nanometers.

SUMMARY OF THE INVENTION

One objective of the present invention is to provide a TAMR head design wherein the spacing between the magnetic field profile and heating profile is reduced at the magnetic medium without degrading the efficiency of the plasmon mode.

A second objective of the present invention is to provide a method of manufacturing a TAMR head design according to the first objective that is readily accomplished with existing tools and materials and has flexibility in terms of enabling various plasmon generator layer shapes.

These objectives are achieved in various embodiments of the present invention wherein a TAMR write head comprises a main pole that has a magnetic core antenna (MCA) overcoated on two converging sides with a plasmon generator (PG) layer. The MCA is formed adjacent to a portion of either a trailing side or leading side of the main pole. Preferably, the MCA has a triangular design having two sides made of a PG layer comprising a highly conductive, non-magnetic metal that intersect at a vertex which is substantially a straight edge. The third side of the triangular shape and a core formed between the two PG layer sides is made of a magnetic material. In one embodiment, the third side and core may be adjoined to a side of the main pole layer and are generally made of the same magnetic material as in the main pole. Alternatively, there may be a non-magnetic separation layer formed between the third side of the MCA and the main pole. In the preferred embodiments, the vertex is formed essentially perpendicular to the ABS and faces a waveguide that is recessed a certain distance from the ABS to reduce optical leakage. Alternatively, the waveguide may have an end at the ABS. The vertex extends in a lengthwise direction parallel to the lengthwise directions of the MCA and waveguide towards the back end of the TAMR head. PG layers are covered with a dielectric layer that separates the MCA from the waveguide and has a low index of refraction to enable efficient optical radiation transfer from the waveguide to the MCA.

A key feature of the present invention is that an end of the PG layer facing the ABS is recessed a certain distance from the ABS. In effect, the magnetic core of the MCA extends to the ABS and the magnetic layer formed between the PG layer end and ABS may have the same shape as the MCA from an ABS view. In other words, a portion of the magnetic layer follows the "V" shape of the PG layer from an end of the PG layer to the ABS. In another embodiment, the magnetic layer between the PG layer end and ABS is part of a trapezoidal shaped pole tip region from an ABS view wherein the trailing edge of the pole tip is formed substantially coplanar with the MCA vertex.

According to one embodiment, the end of the PG layer facing the ABS may be formed in a plane that is parallel to the ABS. In another embodiment, the PG layer end facing the ABS is tapered such that the vertex has a greater length in a direction perpendicular to the ABS than the other two PG edges of the triangular shaped MCA that terminate at the magnetic third side. Thus, the tapered PG layer shape allows for a gradual magnetic flux concentration into the magnetic layer between the PG layers and ABS, and the magnetic layer transmits the plasmon mode into the magnetic medium while delivering a head field at the same location to provide improved overlay of the thermal gradient on the magnetic field gradient.

The present invention also encompasses embodiments wherein a magnetic shield is formed between an end of the waveguide and the ABS. Thus, there is a magnetic shield with a first side along the ABS, a second side that faces the MCA vertex, and a third side that is substantially parallel to the first side and faces a waveguide end.

The present invention includes a method of fabricating an MCA having a recessed PG layer proximate to an ABS in a TAMR head. A "V" shaped trench is formed in a non-magnetic substrate such as a dielectric gap layer in a lengthwise dimension in a direction perpendicular to a first plane and the eventual ABS. A first magnetic layer is deposited on the substrate and covers the sidewalls of the trench. Then a photoresist patterning and etch sequence is performed to remove the magnetic layer except in a region along a side of the first plane. Thereafter, a plasmon generator material is deposited to form a PG layer on exposed sections of each of the two trench sidewalls where the first magnetic layer has been removed. In an alternative embodiment, a PG layer is deposited that not only fills exposed sections of the trench but also covers a portion of substrate on either side of the trench. In all embodiments, the PG layer has an end facing the first plane that may be parallel to the first plane, or tapered by using a shading effect during the deposition. From a cross-sectional view along a plane that is perpendicular to the first plane and bisects the trench in a lengthwise direction, a tapered PG end has a configuration wherein a top edge of the PG layer facing the waveguide is recessed a greater distance from the first plane than the vertex which contacts the substrate at the bottom of the trench. Finally, a second magnetic layer that may have the same composition as the first magnetic layer is deposited on the PG layer and on the first magnetic layer to form a main pole made of first and second magnetic layers. A portion of the second magnetic layer forms a magnetic core of the magnetic core antenna (MCA) wherein the core is adjoined on two sides by the PG layer.

BRIEF DESCRIPTION OF THE DRAWINGS

FIG. 1a shows a prior art TAMR head structure with a plasmon generator having a triangular shape from an ABS view and operating in an edge plasmon mode in the cross-sectional view.

FIG. 1b is a plot that overlays a magnetic field profile on a heating profile from a typical TAMR head and indicates a mis-alignment of the heating slope with the head field gradient.

FIG. 4 is a plot that indicates the efficiency of optical energy coupled into a plasmon mode is reduced as a plasmon generator layer thickness decreases.

FIGS. 5a-5c show a side view, cross-sectional view, and ABS view of an embodiment of the present invention wherein the plasmon generator layer of a MCA is recessed from the ABS and separated therefrom by a magnetic layer.

FIG. 9 is plot showing down-track profiles at the same write current for TAMR heads having MCAs with non-recessed and recessed PG layers as represented in FIG. 7a and FIG. 8a, respectively.

FIGS. 10-17 illustrate various embodiments of the present invention from an ABS and cross-sectional views.

FIG. 18a is an oblique view of a MCA with a multi-sided and recessed PG layer and FIG. 18b is an exploded drawing of the structure in FIG. 18a according to a ninth embodiment of the present invention.

DETAILED DESCRIPTION OF THE INVENTION

The present invention is a TAMR head structure having a main pole with a magnetic core antenna (MCA) including a PG layer formed on two sides of a magnetic core and converging at a vertex that faces a waveguide. An end of the PG layer is recessed from the ABS to improve the overlay of heating spot on the magnetic field gradient at the magnetic medium without significantly degrading plasmon coupling efficiency. Although the exemplary embodiments depict a triangular shaped MCA either adjoining or formed adjacent to a trailing side of the main pole, the present invention also anticipates that the MCA may be formed along a leading side of a main pole and may be a multi-sided structure. The TAMR write head may be part of a merged read/write head design. Furthermore, various embodiments incorporate a magnetic shield formed between a waveguide end and the ABS. The present invention is also a method for forming a recessed PG layer in a MCA design for TAMR applications. The terms surface and side may be used interchangeably when referring to a component such as a PG layer or waveguide. A top surface of a TAMR component is defined as one that is facing a main pole layer. A plasmon generator layer is also known as a plasmon layer.

Figure 2:
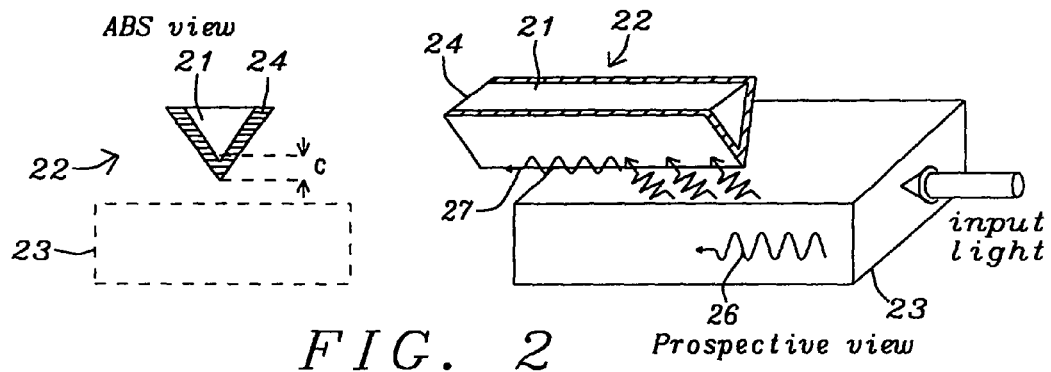
FIG. 2 depicts a MCA design previously disclosed by the inventors wherein a triangular shaped magnetic core antenna has two sides made of a non-magnetic plasmon generator material and third side and core comprised of a magnetic material.

Referring to FIG. 2, a MCA design is shown that was previously disclosed by the inventors in related patent application Ser. No. 12/456,290 and has a triangle shape to couple the edge plasmon mode 27 to the input light 26 from the waveguide 23. Unlike the prior art, the MCA design 22 comprises a magnetic core 21 and a plasmon generator (PG) layer 24 also known as an edge plasmon generator (EPG) having a thickness c on two sides of the core that face the waveguide 23. The plasmon mode is generated by radiative coupling with optical frequency electromagnetic radiation produced by an optical laser or the like and is transmitted toward the ABS within the PG layer 24 while the magnetic core 21 concentrates magnetic flux close to the heating point of the MCA and enhances the magnetic field (not shown) at the magnetic medium heating location during writing. Thus, the MCA 22 effectively becomes an extension of the magnetic pole and produces a magnetic field whose maximum gradient overlaps the magnetic medium region being heated by edge plasmons produced in PG layer 24. The overlap improves the effectiveness of a magnetic field from the write pole in changing local magnetization of the magnetic medium so that magnetic writing is greatly enhanced and can be confined to small surface areas.

Figure 3A:
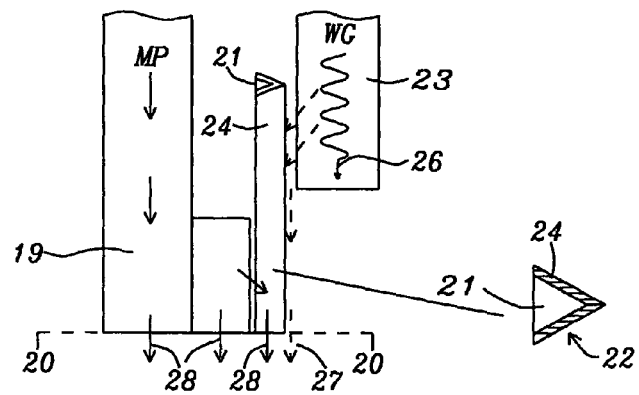
FIG. 3a shows a TAMR head structure incorporating a MCA design as illustrated in FIG. 2 where the vertex of two PG layers faces a waveguide and a third side is adjoined to a main pole.

FIG. 3a shows a MCA head structure wherein there is a main pole 19 with the MCA 22 that has a plasmon carrying edge facing away from the main pole. For the purpose of this illustration, main pole 19 and the magnetic core 21 are assumed to be CoFe and the PG layer 24 is made of Au. A portion of magnetic field 28 from main pole 19 is transmitted through an end of MCA 22 proximate to ABS 20-20 to a magnetic medium (not shown). Thus, the magnetic core 21 is part of the magnetic field generation structure during a recording operation. Waveguide 23 faces an edge (vertex) of MCA carrying the plasmon mode 27 and couples input light 26 into the edge plasmon mode within the gold PG layer 24.

Figure 3B:
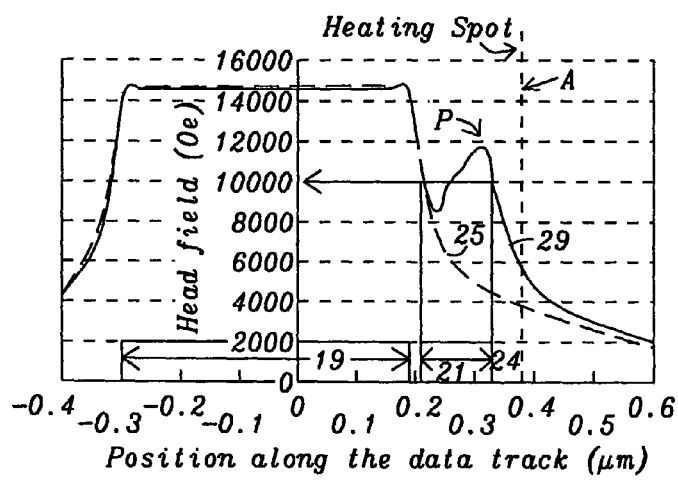
FIG. 3b shows magnetic field profiles in relation to heating spot location for a MCA design as depicted in FIG. 3a and for a PA made of solid Au and shows that the former design reduces the spacing between peak magnetic field and peak heating.

Referring to FIG. 3b, a plot of data track position vs. head field shows field profiles for a MCA configuration (curve 29) represented by FIG. 3a and an example (curve 25) where a pure Au antenna (FIG. 1a) is used instead of a MCA design. Curve 29 for the MCA example has an additional magnetic field peak P beyond the edge of the main pole 19 due to the existence of the magnetic core 21. Therefore, the distance between peak magnetic field and PG layer 24 edge (dashed line A) is significantly reduced compared with the prior art structure (curve 25). However, the heating spot is usually located at PG layer 24 edge or farther to the right of dashed line A in the drawing while peak magnetic field and sharpest gradient location from the MCA core 21 are typically within the outer edge of the magnetic core (left side of left edge of PG layer 24).

To further reduce the distance between peak field and peak heating, a thinner MCA PG layer is a possible solution. Referring to FIG. 4, simulation results are provided for the transmitted power through the edge plasmon mode at various MCA PG layer 24 thicknesses where the MCA is assumed to have a uniform core size and PG layer thickness along a lengthwise dimension. Both Ag alloy (curve 51) and a Au film (curve 52) are considered for the PG layer. Power value is plotted as a percentage of the power transmitted in plasmon mode when a solid Ag alloy antenna is used instead of an MCA. It is readily apparent that as MCA PG layer 24 thickness decreases, the efficiency of optical energy coupled into the plasmon mode is significantly reduced. As a result, less medium heating is also expected at thinner PG layer thickness. Therefore, in current TAMR write heads a trade-off exists between reducing the magnetic field peak to heating peak spacing and achieving efficient heating of the recording medium. In order for TAMR to be considered for high density recording schemes, it is desirable to reduce the magnetic field peak to heating peak spacing without causing significant degradation of the plasmon coupling efficiency.

Herein we disclose a modified MCA structure that addresses the TAMR design challenge presented in the previous paragraph. In particular, various embodiments are described wherein a PG layer is recessed a certain distance from the ABS while a magnetic layer extends from the end of the PG layer to the ABS and has the same shape as the MCA from an ABS view. There are additional embodiments wherein the magnetic layer has a shape from an ABS view that differs from the MCA shape. The main feature in all embodiments is that the magnetic layer between the PG layer end and the ABS simultaneously transmits the plasmon mode and a magnetic field from the main pole so that the head field gradient is more closely overlaid on the heating gradient without any significant loss in heating efficiency at the magnetic medium.

Referring to FIG. 5a, a TAMR head including a MCA configuration with a recessed PG layer 32 is shown from a side view (top) and an ABS view (bottom) according to a first embodiment of the present invention. In the drawings depicted hereinafter, the x-axis refers to the cross-track direction, the y-axis is the down-track direction, and the z-axis arrow points toward a back end of the device. Main pole 31 is comprised of a magnetic material and has an end 31p called a pole tip along the ABS 30-30. Write pole 31p has an edge 31b on a first main pole side that is adjacent to an MCA which includes a PG layer 32 and a magnetic core (not shown in the side view). There is also an edge 31a on a side of the main pole opposite the first side. The PG layer 32 is a non-magnetic material comprised of one or more of Au, Ag, Cu, Al, Ti, Ta, and Ge with a thickness from about 10 to 100 nm. In this embodiment, the MCA has a triangular shape from an ABS view and the PG layer 32 is recessed by a distance "s" of 5 to 100 nm from the ABS. In the ABS view, the magnetic layer 31e formed between the MCA and ABS has a triangular shape of essentially the same size and shape as the MCA (not shown) which is recessed directly behind layer 31e. A key feature is that the magnetic layer 31e transmits the plasmon mode from PG layer 32 to the ABS and magnetic medium (not shown) and also transmits a magnetic field from main pole 31 that has a substantial overlap on the heating spot generated by the plasmon mode. There is a dielectric layer 35 formed between an end of waveguide 37 and the ABS.

In a preferred embodiment, magnetic layer 31e, main pole 31, and the magnetic core 33 (FIG. 5b) of the MCA are made of a magnetic material comprised of one or more of Co, Fe, Ni, or composites thereof with one or more of B, Si, Al, Ta, Ru, O, or N. In one aspect, main pole 31, magnetic layer 31e, and magnetic core 33 may have the same composition. A dielectric gap layer 39 separates main pole 31 and PG layer 32 from waveguide 37. In the exemplary embodiments described herein, the waveguide 37 is recessed a certain distance from the ABS 30-30. However, the present invention also anticipates an embodiment wherein the waveguide 37 may have an end at the ABS. Other layers in the TAMR head such as magnetic coils and shields are not shown. The plane B-B extends in a z-axis direction from the ABS and bisects the TAMR head.

The B-B cross-sectional view depicted in FIG. 5b shows the MCA with PG layer 32 having an edge (vertex 32v) that faces waveguide 37 and an end 32e facing the ABS. Moreover, magnetic core 33 overlays on PG layer 32. The end 32e may be formed in a plane that is parallel to ABS 30-30. However, as depicted in FIG. 10, the end 32e may be replaced by a tapered side 32s such that the vertex 32v is recessed a shorter distance from the ABS 30-30 than top edge 32t.

Referring to FIG. 5c, a cross-sectional view is illustrated from the plane A-A in FIG. 5b. Note that the side of the main pole 31 that adjoins magnetic core 33 may be the leading side or trailing side during a write process when the TAMR head moves in a y-axis direction. In other words, the TAMR components may sequentially cross over a magnetic medium location in the order of MP followed by MCA and then waveguide or in the reverse order. When edge 31a is a leading edge, then the side of main pole 31 that includes edge 31b is a trailing side, and vice versa. Main pole side that includes edge 31b is formed substantially perpendicular to ABS 30-30. PG layer 32 is shown as a "V" shape layer with a magnetic core 33 that abuts a main pole side which includes edge 31b. The two sides of PG layer 32 converge at vertex 32v which forms an edge that is essentially perpendicular to the ABS. In an alternative embodiment that relates to a MCA formed on a leading side of a main pole as described in a later embodiment (FIG. 18), PG layer 32 may be considerably thicker than shown in FIG. 5c and have more than two sides.

Figure 6A:
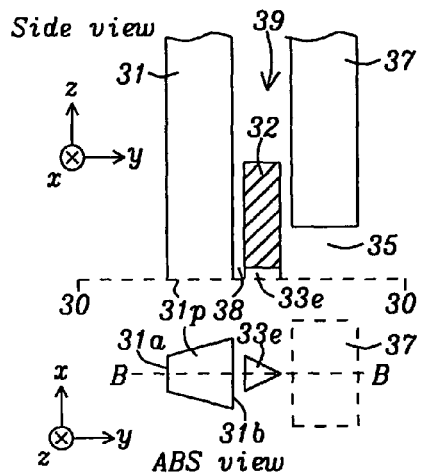
FIGS. 6a-6b show a side, ABS, and cross-sectional views of an embodiment of the present invention wherein the MCA in FIGS. 5a-5c is separated from the main pole layer and the magnetic layer has the same triangular shape as an end of the MCA.
Figure 6B:
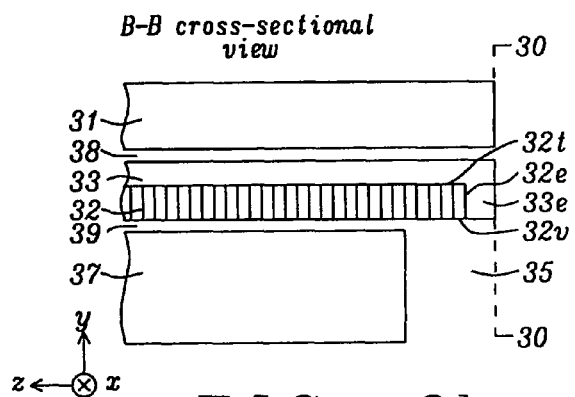

According to a second embodiment shown in FIGS. 6a-6b, there may be a non-magnetic separation layer 38 formed between main pole 31 and the magnetic core 33 so that the aforementioned magnetic layers are separate structures. During a recording (writing) process, main pole 31 magnetizes magnetic core 33 which then produces a magnetic write field in the magnetic medium (not shown) in addition to the field generated by the main pole. The thickness of non-magnetic separation layer 38 is preferably less than 100 nm. PG layer 32 is recessed from the ABS as in the first embodiment. FIG. 6a (top) represents a side view while the bottom is an ABS view of this embodiment. There is a magnetic layer 33e that is effectively an extension of the magnetic core 33 formed between PG layer 32 and ABS 30-30. Thus, magnetic layer 33e may be comprised of the same material as in magnetic core 33. Furthermore, magnetic layer 33e, main pole 31, and magnetic core 33 may all be comprised of the same composition. In this case, the magnetic layer 33e has a triangular shape of essentially the same size from an ABS perspective as that of the recessed MCA and thereby continues the shape of the MCA to the ABS. Dielectric gap layer 39 separates PG layer 32 from waveguide 37 and vertex 32v is preferably less than 50 nm from the nearest waveguide side. Edge 31a of main pole 31 may be either a leading edge or trailing edge as described previously.

With regard to FIG. 6b, a cross-sectional view from the B-B plane in FIG. 6a (bottom) illustrates that the end 32e of PG layer 32 may be formed in a plane that is parallel to ABS 30-30. Alternatively, the end 32e may be replaced by a tapered side as described later with regard to FIG. 11. Vertex 32v faces waveguide 37 and is separated therefrom by dielectric gap layer 39. As described in related patent application Ser. No. 12/456,290, the gap dielectric layer 39 may be comprised of a low refractive index material such as alumina, silicon oxide, silicon oxynitride, or $MgF_2$ to optimize the transmission of the plasmon mode (not shown) along the vertex 32v.

Figure 7A:
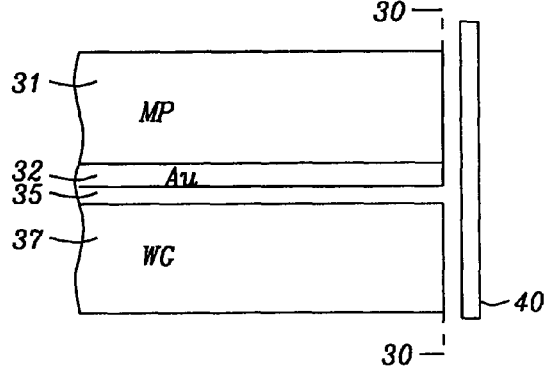
FIG. 7a is a cross-sectional view of a TAMR design where a PG layer in a MCA extends to the ABS.
Figure 7B:
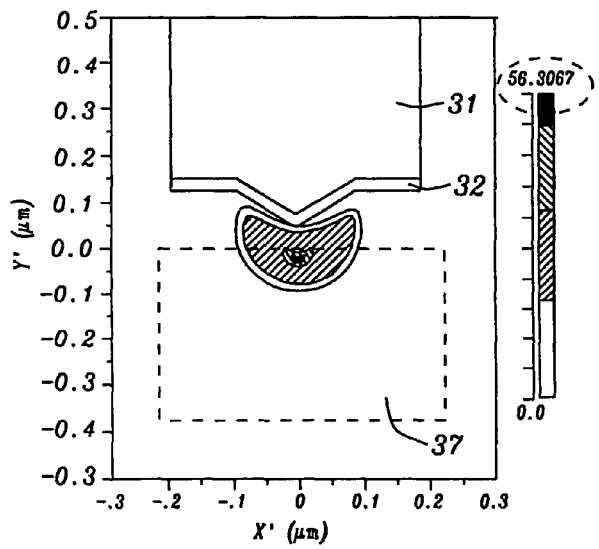
FIG. 7b is a plot showing simulated plasmon coupling efficiency and magnetic field down-track profile for the FIG. 7a design.
Figure 8A:
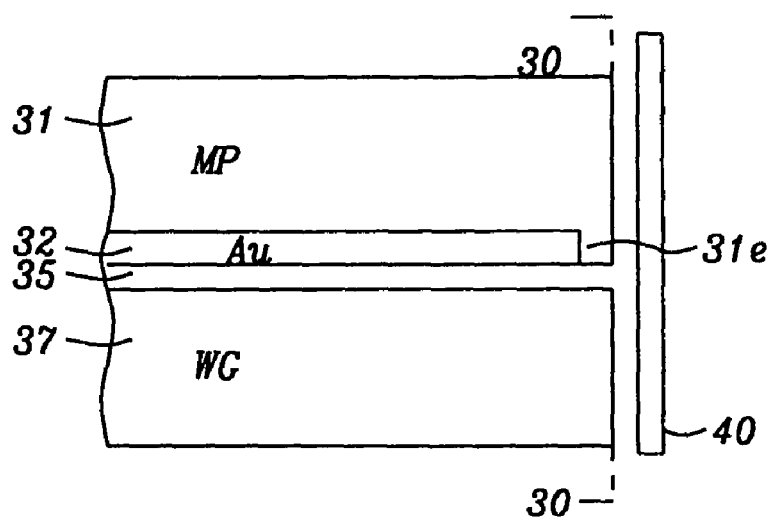
FIG. 8a is a cross-sectional view of a TAMR design according to the present invention wherein a PG layer in a MCA is recessed from the ABS.
Figure 8B:
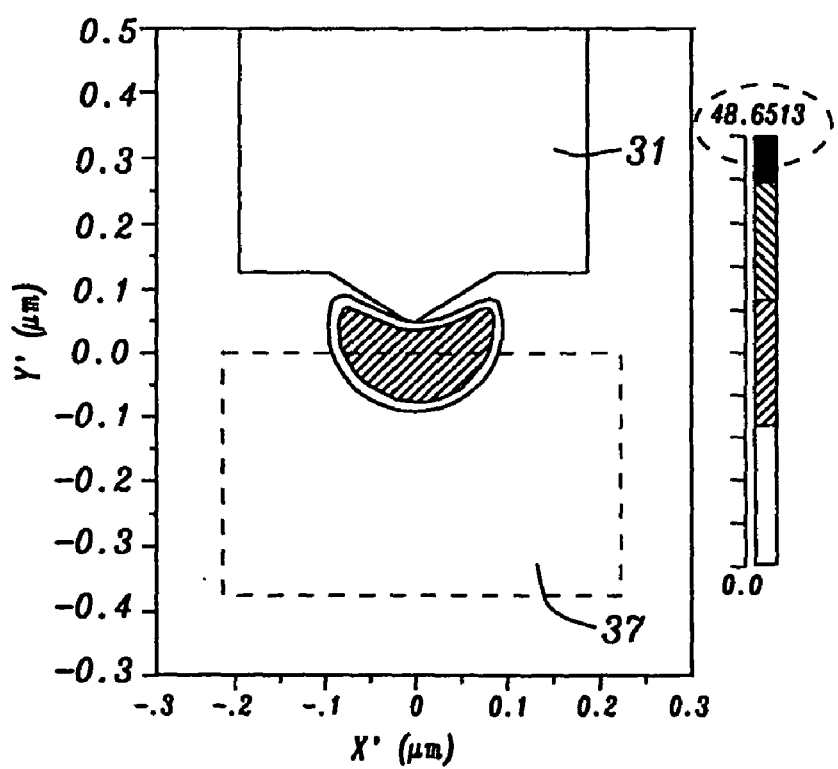
FIG. 8b is a plot showing simulated plasmon coupling efficiency and magnetic field downtrack profile.

Referring to FIG. 7a, a cross-sectional view is shown of a MCA that adjoins a main pole 31 and has a plasmon generator layer 32 made of Au that extends to the ABS 30-30. A magnetic medium 40 is shown facing the ABS. FIG. 7b is a plot illustrating the simulated plasmon intensity in the medium where the gold PG layer in FIG. 7a has a uniform 40 nm thickness. In comparison, FIG. 8a is a cross-sectional view of a MCA according to an embodiment of the present invention where the PG layer 32 in the MCA is separated from the ABS 30-30 by a magnetic layer 31e. The PG layer 32 is a 40 nm thick Au layer that is recessed 10 nm from the ABS. According to FIG. 8b, the simulated plasmon intensity in the medium for the structure in FIG. 8a is about 86% of the maximum intensity of the non-recessed example in FIG. 7a.

Referring to FIG. 9, down-track effective write field profiles of an MCA with a recessed PG layer (curve 54) and with a PG layer adjoining the ABS (curve 53) are shown at the same write current of 30 mA. The MCA with recessed PG layer has the advantages of a peak magnetic field that is 500 Oe higher than that of the non-recessed case, and a peak field shift towards the PA plasmon carrying edge (i.e. the heating spot position) by approximately 40 nm. Thus, the MCA represented by FIG. 8a and other embodiments of the present invention produces both a higher field and much closer magnetic gradient to thermal gradient spacing which are desired for high density TAMR recording. It should be understood that the decrease in maximum plasmon intensity in the medium as a result of a MCA with recessed PG layer is expected due to the magnetic layer not being as good a plasmon carrier as gold or other PG materials. However, with the reduction in magnetic to thermal peak spacing, the effective heating at the medium magnetization transition location during recording is anticipated to be substantially higher than for a non-recessed PG layer structure. In summary, the improved overlap of the thermal gradient with magnetic field gradient realized in MCA structures with recessed PG layers as described herein will enhance the transition sharpness at the magnetic medium and achieve higher recording density.

Referring to FIG. 10, an alternative version of the first embodiment is depicted. All components previously described with respect to FIGS. 5a-5c are retained in FIG. 10 except the end 32e of PG layer 32 is replaced with a sloped side 32s that connects a top edge 32t to vertex 32v. Instead of having top edge 32t and vertex 32v recessed essentially an equal distance from ABS 30-30 in FIG. 5b, top edge 32t that contacts main pole 31 is recessed a greater distance from the ABS than vertex 32v in the B-B cross-sectional view (FIG. 10). In one aspect when the magnetic core 33 is comprised of the same material as the main pole 31, the magnetic core may be deposited simultaneously with the main pole and there is no visible interface between the aforementioned magnetic layers. Although a single magnetic layer deposition may be preferred from an ease of manufacturing standpoint, the present invention does anticipate that the magnetic core 33 may be made of a different material than in the main pole 31 and could be deposited in a separate step. A tapered PG layer 32 configuration shown in FIG. 10 enables a gradual magnetic flux concentration to enter the magnetic layer 31e between the PG layer and ABS 30-30. The spacing between waveguide 37 and vertex 32v is the thickness of gap dielectric layer 39 in a y-axis direction and is preferably less than 50 nm.

Referring to FIG. 11, an alternative version of the second embodiment is depicted. All components previously described with respect to FIGS. 6a-6b are retained in FIG. 11 except the end 32e of PG layer 32 is replaced with a sloped side 32s that connects a top edge 32t to vertex 32v. Instead of having top edge 32t and vertex 32v recessed essentially an equal distance from ABS 30-30 in FIG. 6b, top edge 32t is recessed a greater distance from the ABS than vertex 32v in the B-B cross-sectional view (FIG. 11). From an ABS view, magnetic layer 33e continues the triangular shape of the MCA from side 32s to the ABS and transmits the plasmon mode from the PG layer 32 to the ABS while simultaneously transmitting magnetic flux from main pole 31 and magnetic core 33 to the ABS 30-30 and magnetic medium (not shown).

Figure 12:
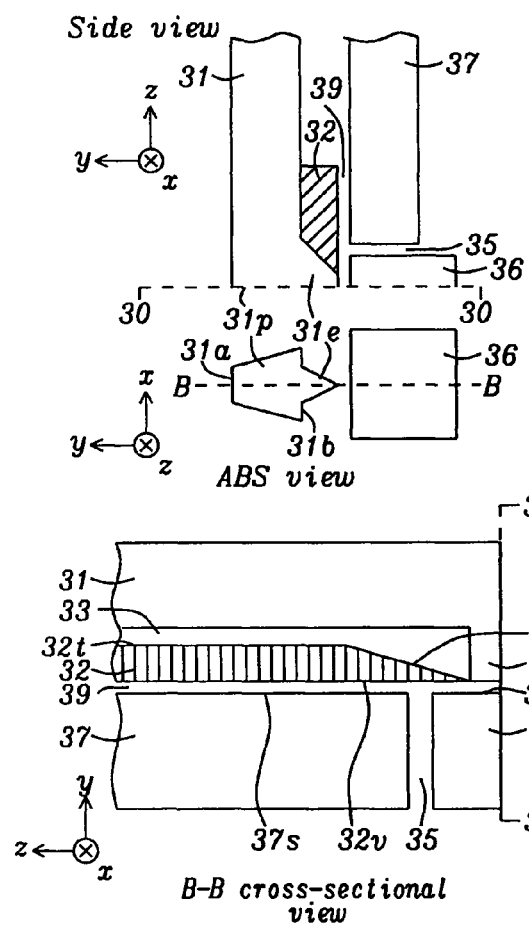

Referring to FIG. 12, a third embodiment of the present invention is shown that represents a modification of the first embodiment depicted in FIG. 10. In particular, a magnetic shield 36 is added to the TAMR head and has a side formed along the ABS 30-30, a side opposite the ABS that faces waveguide 37, and a side 36s facing vertex 32v. Side 36s is preferably coplanar with a side 37s of waveguide 37 that faces vertex 32v. A dielectric gap layer 35 separates waveguide 37 from magnetic shield 36. Magnetic shield 36 may be a trailing shield when edge 31a is a leading edge or may be a leading shield when edge 31a is a trailing edge on main pole 31. Although the exemplary embodiment shows a tapered side 32s connecting top edge 32t to vertex 32v, PG layer 32 may have an end 32e formed parallel to ABS 30-30 as shown previously in FIG. 5b. As appreciated by those skilled in the art, a magnetic shield structure may be included in a TAMR head to optimize both optical and magnetic performance in the writing process. Trailing shield 36 may be comprised of one or more of Co, Fe, Ni, or composites thereof with B, Si, Al, Ta, Ru, O, or N.

Figure 13:
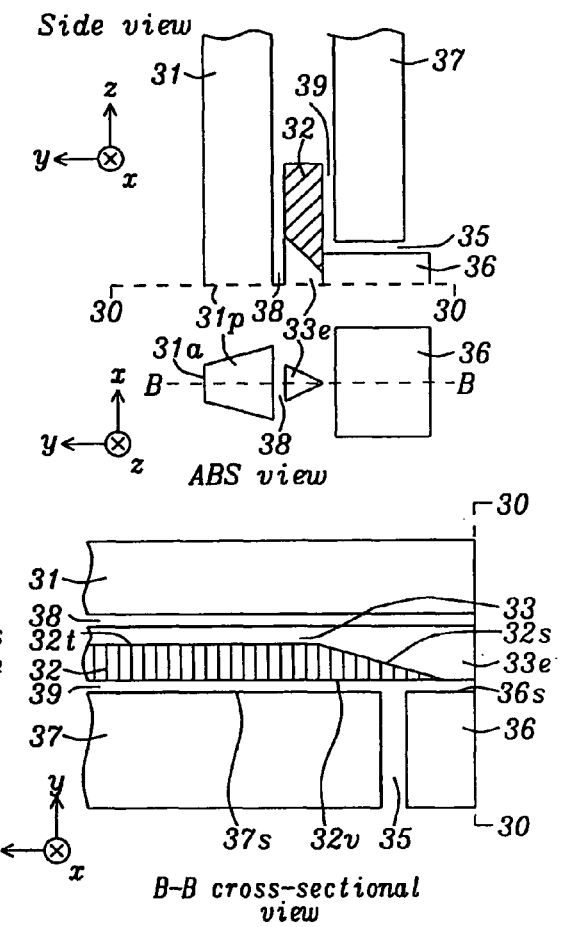

Referring to FIG. 13, a fourth embodiment of the present invention is shown that represents a modification of the second embodiment depicted in FIG. 11. In particular, a magnetic shield 36 is added to the TAMR head and has a side formed along the ABS 30-30, a side opposite the ABS that faces waveguide 37, and a side 36s facing vertex 32v. Side 36s is preferably coplanar with a side 37s of waveguide 37 that faces vertex 32v. A dielectric gap layer 35 separates waveguide 37 from magnetic shield 36. Magnetic shield 36 may be either a trailing shield or leading shield as mentioned previously. Furthermore, tapered side 32s that connects top edge 32t to vertex 32v may be replaced by a PG layer end 32e formed parallel to ABS 30-30 as shown earlier in FIG. 6b.

Figure 14:
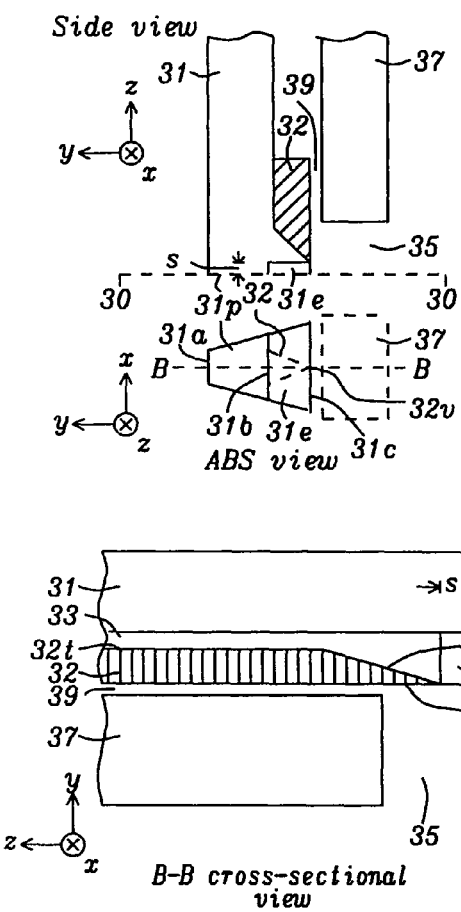

Referring to FIG. 14, a fifth embodiment of the present invention is depicted and represents a modification of the TAMR structure shown in FIG. 10. All components previously described with respect to FIG. 10 are retained in FIG. 14 except the shape of the magnetic layer 31e is changed from an ABS view. In particular, the triangular shape of the magnetic layer is replaced by a trapezoid shape that is larger than the triangular MCA shape. A first side of the magnetic layer 31e interfaces with a side of the main pole 31 that includes edge 31b and is formed in a first plane (not shown) that extends in the z-axis direction from the ABS and includes a side of the PG layer 32 opposite vertex 32v. The first side has a width in a cross-track direction that is essentially the same as that of edge 31b. A side 31c of the magnetic layer 31e opposite edge 31b is formed along a second plane which is parallel to the first plane and includes vertex 32v. Side 31c preferably has a greater width along the cross-track direction than the first side. Furthermore, the two sides which connect edge 31b to side 31c are extensions of the two sides that connect edge 31a to edge 31b in main pole 31.

Figure 15:
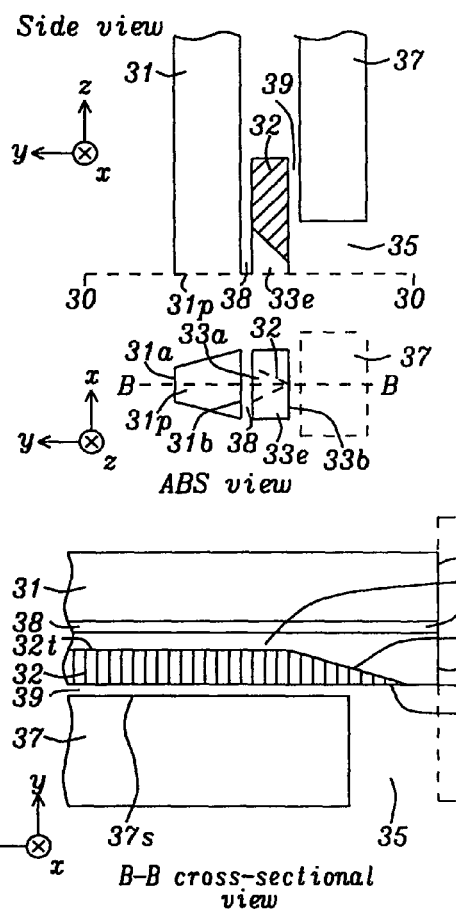

Referring to FIG. 15, a sixth embodiment of the present invention is depicted and represents a modification of the TAMR structure shown in FIG. 11. All components previously described with respect to FIG. 11 are retained in FIG. 15 except the shape of the magnetic layer 33e is changed from an ABS view. In particular, the triangular shape of the magnetic layer is replaced by a rectangular shape that is larger than the triangular MCA shape. One side 33a of the magnetic layer 33e adjoins separation layer 38 and faces edge 31b. Moreover, side 33a has a width in a cross-track direction that is essentially the same as that of edge 31b. A second side 33b of magnetic layer 33e is formed opposite side 33a and along a plane that extends in the z-axis direction and includes vertex 32v. The width of side 33a is substantially the same as that of side 33b. The two sides that connect side 33a to side 33b are formed perpendicular to the ABS and extend in a z-axis direction from the ABS.

Referring to FIG. 16, a seventh embodiment of the present invention is shown that represents a modification of the fifth embodiment depicted in FIG. 14. In particular, a magnetic shield 36 is added to the TAMR head and has a side formed along the ABS 30-30, a side opposite the ABS that faces waveguide 37, and a side 36s facing vertex 32v. Side 36s is preferably coplanar with a side 37s of waveguide 37. A dielectric gap layer 35 separates waveguide 37 from magnetic shield 36. Magnetic shield 36 may be either a trailing shield or leading shield as mentioned previously. Furthermore, tapered side 32s that connects top edge 32t to vertex 32v may be replaced by a PG layer end 32e formed parallel to ABS 30-30 as shown earlier in FIG. 5b.

Referring to FIG. 17, an eighth embodiment of the present invention is shown that represents a modification of the sixth embodiment depicted in FIG. 15. A magnetic shield 36 is added to the TAMR head and has a side formed along the ABS 30-30, a side opposite the ABS that faces waveguide 37, and a side 36s facing vertex 32v. Side 36s is preferably coplanar with a side 37s of waveguide 37. A dielectric gap layer 35 separates waveguide 37 from magnetic shield 36. Magnetic shield 36 may be either a trailing shield or leading shield.

Furthermore, tapered side 32s may be replaced by a PG layer end 32e formed parallel to ABS 30-30 as shown earlier in FIG. 6b.

Figure 18B:
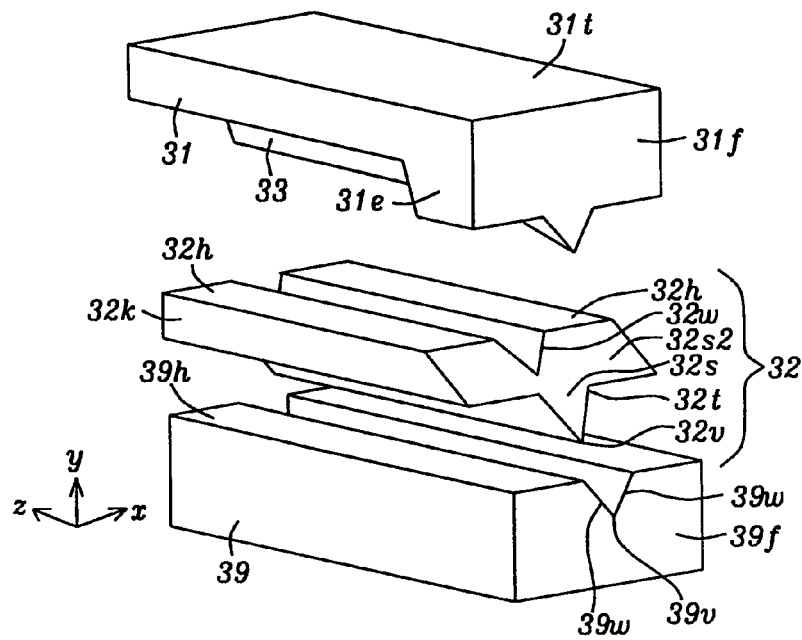

Referring to FIG. 18a, a ninth embodiment of the present invention is depicted and shows an oblique view of a plasmon generator layer 32 formed between a dielectric layer 39 and a magnetic layer 31e that serves as an extension of magnetic core 33 between a PG layer end 32s and the ABS (not shown). The ABS includes a write pole end 31f and an end 39f of the dielectric layer 39. The ninth embodiment is a modification of the first embodiment wherein the PG layer 32 is substantially thicker than previously described. In particular, PG layer 32 extends outside the trench defined by two sidewalls 39w. As illustrated in more detail in the exploded view in FIG. 18b, the PG layer 32 includes not only tapered side 32s and a lower portion formed within the "V" shaped trench between sidewalls 39w, but also comprises an upper portion including side sections 32k with a top surface 32h on either side of the trench with vertex 39v. Side sections 32k each have a tapered end 32s2 that is formed in the same plane as tapered end 32s and a top surface 32h formed parallel to top surface 39h. In the exemplary embodiment, a trench bounded by sidewalls 32w is formed in the top surface 32h of PG layer 32 and is filled with magnetic core 33. Magnetic core 33 interfaces with main pole layer 31 that also contacts PG side sections 32k on either side of the magnetic core. In this case, magnetic layer 31e continues the shape of the PG layer between ends 32s, 32s2 and the ABS and simultaneously transmits the plasmon mode from PG layer 32 and magnetic flux from magnetic core 33 and the main pole with top surface 31t. PG layer 32 is considered to have a triangular shaped lower portion that terminates in a vertex 32v which faces a waveguide (not shown), and a upper portion including side sections 32k adjoining the lower portion along a side opposite the vertex. Thus, the plasmon antenna comprises PG layer 32 and a magnetic core 33 formed within the trench defined by sidewalls 32w and has a substantially rectangular shape from the ABS in the exemplary embodiment. Furthermore, magnetic layer 31e continues the shape of PG layer 32 between ends 32s, 32s2 and the ABS and is magnetically connected to magnetic core 33.

The present invention includes a method of fabricating a TAMR head with recessed PG layer in a MCA. In the exemplary embodiment illustrated in FIGS. 19-24, a process sequence is shown for making a TAMR structure according to the ninth embodiment and involves a sequence where a first magnetic layer is formed along the ABS followed by plasmon layer deposition, and then a second magnetic layer is deposited on the first magnetic layer and plasmon layer to simultaneously form a magnetic core in a MCA and an overlying main pole layer. However, those skilled in the art will appreciate that a similar sequence of steps may be used to fabricate a structure depicted in one of the first eight embodiments. For example, deposition of the PG layer 32 according to the first eight embodiments is restricted within the trench defined by sidewalls 39w (FIG. 19) and can be achieved with an appropriate photoresist mask that covers top surface 39h to prevent PG material from being deposited in said top surface regions. Thus, PG layer 32 only partially fills trench 60 in the alternative embodiment. Subsequent deposition of a second magnetic layer as described hereinafter may form a magnetic core 33 within trench 60 to produce a triangular shaped MCA, and an overlying main pole 31 that adjoins a surface of the magnetic core. Furthermore, another embodiment may comprise a total of three magnetic layer depositions. Instead of a second magnetic layer deposition to form magnetic core 33 and overlying main pole 31, the magnetic core 33 may be formed in a separate deposition. For example, the second magnetic layer deposition is used to form magnetic core 33 and is then followed by deposition of a separation layer 38, and then a third magnetic layer deposition to form a main pole 31 as described previously with regard to TAMR structures in the second, fourth, sixth, and eighth embodiments.

Figure 19:
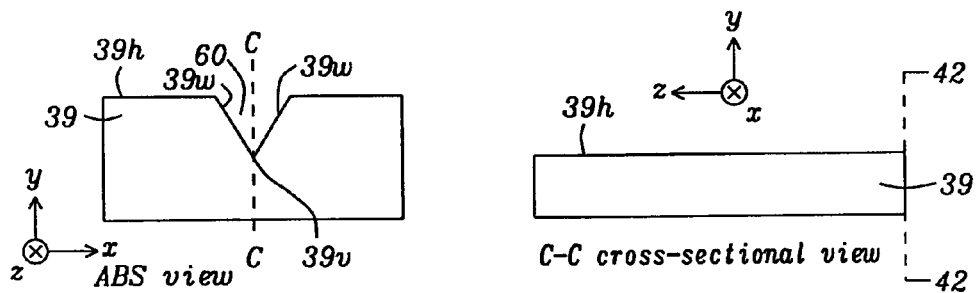
FIGS. 19-24 depict a series of steps used to form a TAMR head having a MCA with a PG layer that is separated from an ABS by a magnetic layer according to the ninth embodiment of the present invention.

Referring to FIG. 19, a substrate that may be a dielectric layer 39 is formed on a sub-structure (not shown) that typically consists of an AlTiC substrate and a read head (not shown) including a sensor structure. Moreover, a waveguide having a lengthwise dimension along the z-axis direction is typically included in the sub-structure. Dielectric layer 39 is deposited by a chemical vapor deposition (CVD), plasma vapor deposition (PVD), or the like, and may be planarized by a CMP step, if necessary. The z-axis direction in this context is towards the back end of the TAMR head. A trench 60 having sidewalls 39w and vertex 39v is formed in the top surface 39h by a conventional photoresist patterning and etching sequence. Vertex 39v is essentially an edge that is formed perpendicular to the cross-track and down-track directions of the TAMR head. Therefore, trench 60 has a lengthwise dimension in a direction perpendicular to the ABS formed in a subsequent step. There is a plane C-C depicted that essentially bisects the trench 60 along the lengthwise direction from an ABS view (left side). In the right hand side view, plane 42-42 represents a front end of the device. It should be understood that the ABS will be formed substantially parallel to plane 42-42 and in a z-axis direction from the plane 42-42 after all TAMR layers are formed and a lapping process is completed.

Figure 20:
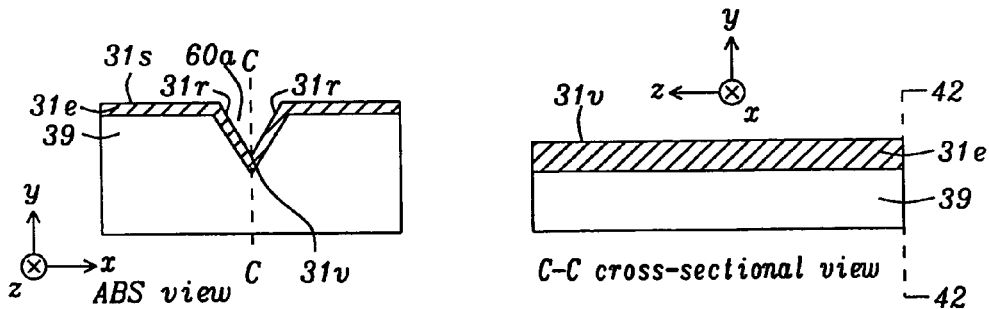

Referring to FIG. 20, magnetic layer 31e is deposited on dielectric layer 39 by a conventional technique such as ion beam deposition (IBD), CVD, or PVD. In the exemplary embodiment as depicted in the ABS view, magnetic layer 31e partially fills trench 60 to form sidewalls 31r that converge at vertex 31v, and covers a portion of surface 39h to form a section 31s on either side of partially filled trench 60a. In an alternative embodiment (not shown), the deposition time may be extended such that magnetic layer 31e completely fills trench 60 and has a greater thickness in the y-axis direction. From a C-C cross-sectional view, magnetic layer 31e extends a substantial distance in a z-axis direction.

Figure 21:
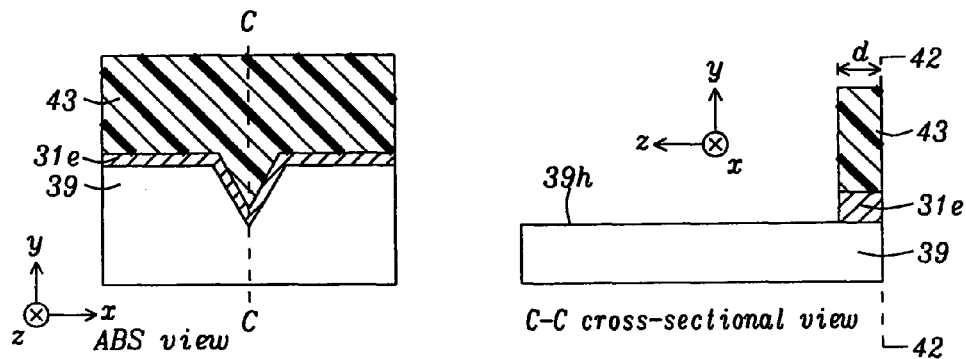

Referring to FIG. 21, a photoresist 43 also known as a photomask is formed by a standard lithography technique on a portion of magnetic layer 31e along plane 42-42. Photoresist 43 extends a distance d from plane 42-42 and leaves magnetic layer 31e uncovered in regions formed at a distance greater than d from plane 42-42. Thereafter, an etch process is performed to remove the unprotected regions of magnetic layer 31e and thereby uncover portions of dielectric layer 39 including top surface 39h and trench 60 at distances greater than d from plane 42-42. In one aspect, a reactive ion etch (RIE) may be employed for the etch process. Optionally, an ion beam etch (IBE) may be used for removing unprotected regions of magnetic layer 31e.

Figure 22:
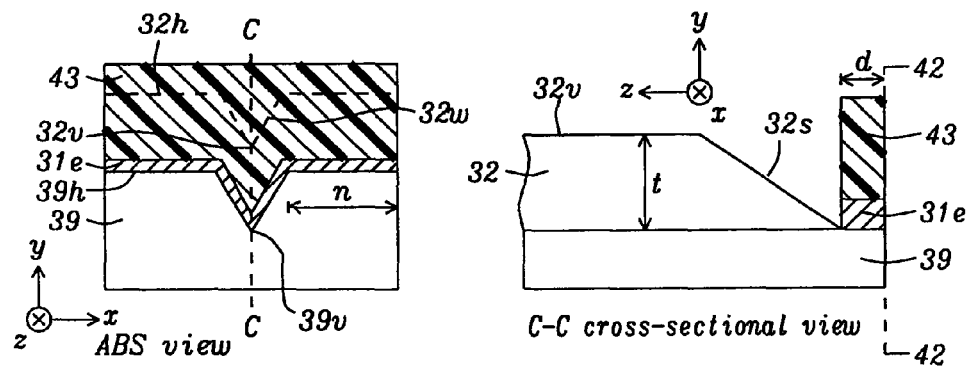

Referring to FIG. 22, PG layer 32 is deposited on exposed regions of trench 60 and top surface 39h generated during the previous etch process. Photoresist 43 and PG layer 32 may extend a distance n from trench 60 in a cross-track direction along the ABS. Although PG layer 32 is shown with a maximum thickness t above dielectric layer 39 which is substantially greater than the thickness of magnetic layer 31e in a y-axis direction, the present invention anticipates that magnetic layer 31e may be considerably thicker and have a thickness that is $\geq t$. As indicated previously, the first eight embodiments comprise a PG material deposition wherein PG layer 32 is has a "V" shaped structure (FIG. 5c). However, as depicted in FIG. 22, PG layer deposition may be continued such that PG layer 32 completely fills exposed portions of trench 60, and vertex 32v is formed a certain distance above top surface 39h of dielectric layer 39. Note that PG layer 32 preferably has a tapered end 32s facing plane 42-42 which may be fabricated by a well known shading effect during deposition. In one aspect, vertex 32v is recessed a distance d from plane 42-42. A second trench is formed in a top surface 32h above trench 60 and is defined by sidewalls 32w and a vertex 32v that is essentially an edge formed parallel to vertex 39v.

Figure 23:
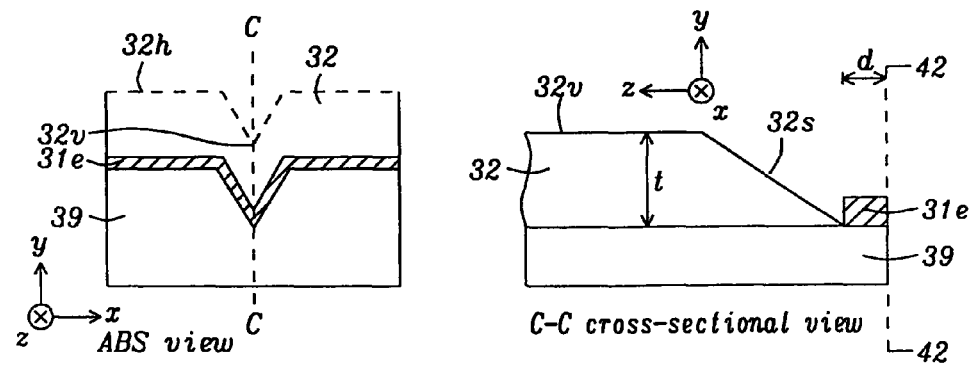

Referring to FIG. 23, photoresist 43 is removed by a conventional stripping method to leave an exposed magnetic layer 31e along plane 42-42. PG layer 32 is recessed by a minimum distance d and vertex 32v is recessed by a distance greater than d.

Figure 24:
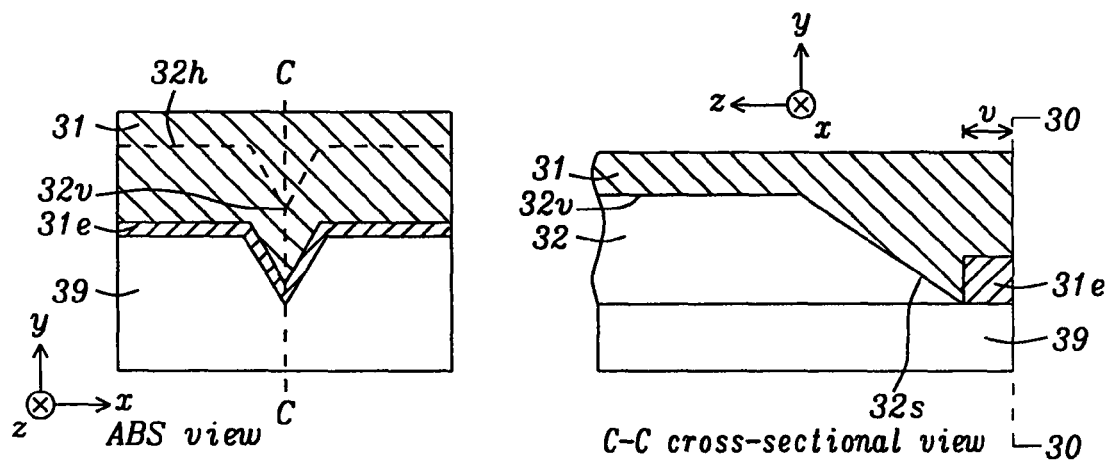

Referring to FIG. 24, a magnetic layer 31 is electrodeposited or formed by an IBD method on PG layer 32 and on magnetic layer 31e. Together, magnetic layers 31, 31e form a single body main pole. ABS 30-30 is shown after a conventional lapping step is employed to remove a front side of the TAMR head adjacent to plane 42-42. In other words, the lapping step removes a portion of main pole 31, magnetic layer 31e, and dielectric layer 39 along plane 42-42 and generates an ABS that is substantially parallel to the former location of plane 42-42.

The present invention has an advantage over a prior art TAMR head in that it provides an improved overlay of the thermal heating spot on the magnetic field gradient at the magnetic medium. As a result, the thermal assist feature generated by the embodiments described herein is more efficient and a weaker applied field may be used to cause a magnetization switch in the magnetic medium during a write process. The recessed PG layer is compatible with a trailing or leading shield for improved magnetic performance and higher data density, and may be tapered to allow for a gradual magnetic flux concentration into the magnetic layer between the PG layer and ABS.

While this invention has been particularly shown and described with reference to, the preferred embodiment thereof, it will be understood by those skilled in the art that various changes in form and details may be made without departing from the spirit and scope of this invention.

We claim:

1. A thermally assisted magnetic recording (TAMR) head comprising:
   (a) a main pole layer having a first side formed substantially perpendicular to an air bearing surface (ABS) and with a write pole end at the ABS comprised of a first edge on the first side having a width in a cross-track direction, and a second edge on a side opposite the first side, said main pole layer produces a magnetic field on a magnetic medium during a write process;
   (b) an optical waveguide for directing electromagnetic radiation from a light source to a plasmon antenna, said optical waveguide has a first side facing a plasmon antenna;
   (c) the plasmon antenna having a first side and magnetic core formed adjacent to the first side of the main pole layer, a second side and third side comprised of a plasmon layer overlaid on the magnetic core and converging at a vertex (tip) formed proximate to the optical waveguide, and an end facing the ABS, said plasmon layer generates an edge plasmon mode proximate to the vertex when coupled with electromagnetic radiation from the optical waveguide; and
   (d) a magnetic layer which is magnetically connected to said magnetic core and formed between the end of the plasmon layer and the ABS, said magnetic layer transmits magnetic flux from the main pole layer and transmits energy from the edge plasmon mode onto a localized region of said magnetic medium thereby heating said localized region and reducing its magnetic coercivity and anisotropy.

2. The TAMR head of claim 1 wherein the first side of the main pole layer adjoins the first side of the plasmon antenna so that the magnetic core is part of the write pole.

3. The TAMR head of claim 1 further comprised of a non-magnetic separation layer formed between the first side of the main pole and the first side of the plasmon antenna.

4. The TAMR head of claim 1 wherein the magnetic core is comprised of one or more of Co, Fe, and Ni, or is a composite of said one or more of Co, Fe, and Ni with one or more of B, Si, Al, Ta, Ru, O, and N.

5. The TAMR head of claim 1 wherein the plasmon layer is comprised of a non-magnetic material that is of one or more of Au, Ag, Cu, Al, Ti, Ta, and Ge.

6. The TAMR head of claim 1 wherein said optical waveguide has an end at the ABS.

7. The TAMR head of claim 1 wherein said optical waveguide is recessed a certain distance from the ABS and has an end facing the ABS.

8. The TAMR head of claim 1 wherein the end of the plasmon layer is recessed a distance of about 5 to 100 nm from the ABS.

9. The TAMR head of claim 2 wherein the plasmon antenna has a triangular shape from an ABS view, and the magnetic layer has essentially the same triangular shape as the plasmon antenna from the ABS view and contacts the first edge of the write pole end.

10. The TAMR head of claim 3 wherein the plasmon antenna has a triangular shape from an ABS view, and the magnetic layer has essentially the same triangular shape as the plasmon antenna from the ABS view and has a side facing the first side of the main pole that contacts the separation layer.

11. The TAMR head of claim 7 further comprised of a magnetic shield with a side along the ABS, a second side opposite the ABS that faces the end of the optical waveguide, and a third side facing the vertex of the plasmon antenna and formed essentially coplanar with the first side of the optical waveguide.

12. The TAMR head of claim 3 wherein said optical waveguide is recessed a certain distance from the ABS and has an end facing the ABS, and wherein the TAMR head is further comprised of a magnetic shield with a side along the ABS, a second side opposite the ABS that faces the end of the optical waveguide, and a third side facing the vertex of the plasmon antenna and formed essentially coplanar with the first side of the optical waveguide, and wherein each of said plasmon antenna and magnetic layer have a triangular shape from an ABS view.

13. The TAMR head of claim 2 wherein the plasmon antenna has a triangular shape and the magnetic layer has a trapezoid shape from an ABS view, said magnetic layer has a first side adjoining the first edge of the write pole end and having essentially the same width in a cross-track direction as the first edge, and a second side formed opposite the first side with respect to the first edge and having a width greater than that of the first edge.

14. The TAMR head of claim 3 wherein the plasmon antenna has a triangular shape and the magnetic layer has a rectangular shape from an ABS view, said magnetic layer has a first side adjoining the separation layer and having essentially the same width as in a cross-track direction as the first edge, and a second side formed opposite the first side with respect to the first edge and having a width essentially the same as that of the first side.

15. The TAMR head of claim 13 wherein said optical waveguide is recessed a certain distance from the ABS and has an end facing the ABS, and wherein the TAMR head is further comprised of a magnetic shield with a side adjoining the ABS, a second side opposite the ABS that faces the end of the optical waveguide, and a third side facing the vertex of the plasmon antenna and formed essentially coplanar with the first side of the optical waveguide.

16. The TAMR head of claim 14 wherein said optical waveguide is recessed a certain distance from the ABS and has an end facing the ABS, and wherein the TAMR head is further comprised of a magnetic shield with a side adjoining the ABS, a second side opposite the ABS that faces the end of the optical waveguide, and a third side facing the vertex of the plasmon antenna and formed essentially coplanar with the first side of the optical waveguide.

17. The TAMR head of claim 1 wherein the end of the plasmon layer facing the ABS is tapered such that the tip of the vertex is recessed a lesser distance from the ABS than a top edge adjoining the main pole layer.

18. A thermally assisted magnetic recording (TAMR) head comprising:
   (a) a main pole layer with a write pole end at the ABS, said main pole layer produces a magnetic field on a magnetic medium during a write process;
   (b) an optical waveguide for directing electromagnetic radiation from a light source to a plasmon antenna, said optical waveguide has a side facing a plasmon antenna;
   (c) the plasmon antenna having a lower triangular shaped portion including a vertex that faces the optical waveguide, and an upper portion with a top surface that contacts the main pole layer and includes a trench which is filled with a magnetic core, said lower triangular shaped portion and upper portion each have a tapered end that faces the ABS and forms a single plane, and said plasmon layer generates an edge plasmon mode proximate to the vertex when coupled with electromagnetic radiation from the optical waveguide; and
   (d) a magnetic layer which is magnetically connected to said magnetic core and formed between the end of the plasmon layer and the ABS, said magnetic layer transmits magnetic flux from the main pole layer and transmits energy from the edge plasmon mode onto a localized region of said magnetic medium thereby heating said localized region and reducing its magnetic coercivity and anisotropy.

19. A method of fabricating a TAMR head with a magnetic core antenna (MCA), comprising:
   (a) providing a substrate comprising an optical waveguide on which a dielectric layer having a top surface is formed;
   (b) forming a first trench with two sides that converge at a vertex within said dielectric layer, said first trench has a lengthwise dimension in a direction that is perpendicular to a plane which is substantially parallel to a cross-track direction and to a down-track direction in the TAMR head;
   (c) forming a first magnetic layer on the sides of the first trench and on the first dielectric layer along the plane, said first magnetic layer extends a first distance from the plane along the lengthwise dimension of the first trench;
   (d) depositing a plasmon layer having a top surface that at least covers the sidewalls of the first trench in regions not covered by the first magnetic layer, said plasmon layer has an end facing the plane that is tapered such that a bottom surface contacting the vertex of the first trench is recessed a lesser distance from the plane than the top surface;
   (e) depositing a second magnetic layer on the plasmon layer and on the first magnetic layer thereby forming a MCA comprised of a plasmon layer, and a magnetic core comprised of the second magnetic layer; and
   (f) performing a lapping step that removes a portion of the first magnetic layer, second magnetic layer, and dielectric layer adjacent to the plane thereby forming an air bearing surface (ABS), said MCA is separated from the ABS by the first magnetic layer.

20. The method of claim 19 wherein depositing the plasmon layer further comprises forming an upper portion of plasmon layer on the dielectric layer adjacent to both sides of the trench, said upper portion has a top surface with a second trench formed therein and aligned above and parallel to the first trench.

21. The method of claim 20 wherein a portion of second magnetic layer fills the second trench and thereby forms the magnetic core.

22. The method of claim 19 wherein the first trench is partially filled by the plasmon layer and depositing the second magnetic layer fills the first trench to form a magnetic core and a main pole layer adjoined to a side of the magnetic core that is opposite the vertex of the first trench.

23. The method of claim 19 further comprised of forming a non-magnetic separation layer on the second magnetic layer, and then depositing a third magnetic layer on the non-magnetic separation layer thereby forming a main pole layer before the lapping process is performed.

24. The method of claim 19 wherein the magnetic core is comprised of one or more of Co, Fe, and Ni, or is a composite of said one or more of Co, Fe, and Ni with one or more of B, Si, Al, Ta, Ru, O, and N.

25. The method of claim 19 wherein the plasmon layer is comprised of a non-magnetic material that is of one or more of Au, Ag, Cu, Al, Ti, Ta, and Ge.

26. The method of claim 19 wherein the end of the plasmon layer is recessed a distance of about 5 to 100 nm from the ABS.

27. The method of claim 19 wherein the first magnetic layer and the second magnetic layer have the same composition.

* * * * *